(12) United States Patent
Fuller et al.

(10) Patent No.: US 10,460,418 B2
(45) Date of Patent: Oct. 29, 2019

(54) BUFFER INDEX FORMAT AND COMPRESSION

(71) Applicant: Microsoft Technology Licensing, LLC, Redmond, WA (US)

(72) Inventors: Martin Jon Irwin Fuller, Warwick (GB); Ivan Nevraev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 15/626,679

(22) Filed: Jun. 19, 2017

(65) Prior Publication Data

US 2018/0232849 A1  Aug. 16, 2018

Related U.S. Application Data

(60) Provisional application No. 62/457,711, filed on Feb. 10, 2017.

(51) Int. Cl.
*G06F 15/80* (2006.01)
*G06T 1/60* (2006.01)
(Continued)

(52) U.S. Cl.
CPC ............ *G06T 1/60* (2013.01); *G06T 9/001* (2013.01); *G06T 15/005* (2013.01); *G06T 17/10* (2013.01)

(58) Field of Classification Search
None
See application file for complete search history.

(56) References Cited

U.S. PATENT DOCUMENTS 5,369,744 A * 11/1994 Fukushima ............... G06T 1/20
345/501
5,867,167 A   2/1999 Deering
(Continued)

OTHER PUBLICATIONS

Berliner, et al., "Novel Algorighms for Index & Vertex Data Compression and Decompression", https://www.google.com/url?sa=t&rct=j&q=&esrc=s&source=web&cd=1&cad=rja&uact=8&ved=0ahUKEwjE5tT-8qLSAhWlwl8KHQZ3CplQFggZMAA&url=http%3A%2F%2Fcs.ucf.edu%2Fcssd%2Ffall14%2Fnca%2Ffiles%2FConference%2520Paper%2520%2520Novel%2520Algorithms%2520for%2520Index%2520%26%2520Vertex%2520Data%2520Compression%2520an [Retrieved Feb. 21, 2017; 5 pages].

(Continued)

*Primary Examiner* — Anh-Tuan V Nguyen
(74) *Attorney, Agent, or Firm* — Arent Fox LLP

(57) ABSTRACT

Flexible, dynamic, and efficient compression and de-compression mechanisms are described. An example compression mechanism includes reading a plurality of groups of indices, identifying a smallest index in each of the plurality of groups, rotating indices in each of the plurality of groups such that the smallest index is a first value, calculating unsigned delta encoded values relative to the smallest index in each of the plurality of groups for remaining indices, converting the plurality of groups of indices into a plurality of compressed groups of indices, and storing the plurality of compressed groups of indices. An example de-compression mechanism include reading a plurality of compressed groups of indices, identifying a first index as an absolute value in each of the plurality of groups, calculating remaining indices of each of the plurality of groups, and converting the plurality of compressed groups of indices into a plurality of decompressed groups of indices.

22 Claims, 10 Drawing Sheets

(51) Int. Cl.
*G06T 15/00* (2011.01)
*G06T 17/10* (2006.01)
*G06T 9/00* (2006.01)

(56) References Cited

U.S. PATENT DOCUMENTS

| | | | |
|---|---|---|---|
| 6,304,676 B1 | 10/2001 | Mathews | |
| 6,426,747 B1* | 7/2002 | Hoppe | G06T 1/60 345/419 |
| 8,736,607 B1 | 5/2014 | Fishwick | |
| 8,947,444 B1 | 2/2015 | Hakura et al. | |
| 2005/0123056 A1* | 6/2005 | Wang | H04N 19/70 375/240.25 |
| 2012/0281004 A1* | 11/2012 | Shebanow | G09G 5/36 345/557 |
| 2014/0022355 A1* | 1/2014 | Poursohi | G01B 11/2513 348/47 |
| 2014/0067862 A1* | 3/2014 | Deshwal | G06F 17/30657 707/780 |
| 2014/0176589 A1* | 6/2014 | Duluk, Jr. | G09G 5/001 345/541 |
| 2014/0362100 A1 | 12/2014 | Cerny et al. | |
| 2014/0375665 A1* | 12/2014 | Surti | G06T 11/40 345/555 |
| 2015/0062154 A1 | 3/2015 | Ellis et al. | |
| 2015/0100574 A1* | 4/2015 | Presta | G06F 17/30584 707/737 |
| 2015/0109288 A1 | 4/2015 | Yang | |
| 2015/0154733 A1* | 6/2015 | Amsinck | G06T 1/60 345/545 |
| 2016/0328822 A1* | 11/2016 | Liao | G06T 1/60 |
| 2017/0236335 A1 | 8/2017 | Endresen | |
| 2017/0262954 A1* | 9/2017 | Arntzen | G06T 15/005 |

OTHER PUBLICATIONS

"Adding Vertex Compression to Index Buffer Compression", http://conorstokes.github.io/2015/04/28/adding-vertex-compression-to-index-buffer-compression, Published on: Apr. 28, 2015, 12 pages.

"Simple lossless(*) index buffer compression", https://fgiesen.wordpress.com/2013/12/14/simple-lossless-index-buffer-compression/, Published on: Dec. 14, 2013, 8 pages.

Stokes, Conor, "IndexBufferCompression", https://github.com/ConorStokes/IndexBufferCompression, Retrieved on: Feb. 28, 2017, 2 pages.

Gurung, et al., "LR: Compact Connectivity Representation for Triangle Meshes", In Proceedings of Special Interest Group on Computer Graphics and Interactive Techniques Conference, Jan. 1, 2011, 8 Pages.

Gurung, et al., "Zipper: A Compact Connectivity Data Structure for Triangle Meshes", In Proceedings of Computer-Aided Design, vol. 45, Issue 2, Feb. 2013, pp. 262-269.

Isenburg, et al., "Streaming Meshes", In Proceedings of IEEE Visualization, Oct. 23, 2005, pp. 231-238.

"International Search Report and Written Opinion Issued in PCT Application No. PCT/US2018/016541", dated May 15, 2018, 12 Pages.

* cited by examiner

| Index format | Absolute value | Deltas | Comment | Bytes | Bandwidth |
|---|---|---|---|---|---|
| 12_1010 | 1 | 2 | 4095 max abs, 2x 1024 max delta | 4 | 66% of index16 |
| 14_99 | 1 | 2 | 16383 max abs, 2x 512 max delta | 4 | 66% of index16 |

*FIG. 7*

| Index format | Absolute value | Deltas | Comment | Bytes | Bandwidth |
|---|---|---|---|---|---|
| 9_777_2 | 1 | 5 | 511 max abs, 3 x 127 max delta | 4 | 50% of index16 |
| 16_101010_2 | 1 | 5 | 65535 max abs, 3 x 1023 max delta | 6 | 75% of index16 |
| 32_101010_2 | 1 | 5 | 32 bit max abs, 3 x 1023 max delta | 8 | 50% of index32 |

*FIG. 8*

BUFFER INDEX FORMAT AND COMPRESSION

CLAIM OF PRIORITY

The present application for patent claims priority to U.S. Provisional Patent Application No. 62/457,711, filed Feb. 10, 2017, entitled "Buffer Index Format and Compression," which is assigned to the assignee hereof, and hereby expressly incorporated by reference herein.

BACKGROUND

The present disclosure relates to a computer graphics system, and more particularly, to buffer formats and buffer compression in rendering graphics on a computer device.

Computer graphics systems, which can render 2D objects or objects from a 3D world (real or imaginary) onto a two-dimensional (2D) display screen, are currently used in a wide variety of applications. For example, 3D computer graphics can be used for real-time interactive applications, such as video games, virtual reality, scientific research, etc., as well as off-line applications, such as the creation of high resolution movies, graphic art, etc. Typically, the graphics system includes a graphics processing unit (GPU). A GPU may be implemented as a co-processor component to a central processing unit (CPU) of the computer, and may be provided in the form of an add-in card (e.g., video card), co-processor, or as functionality that is integrated directly into the motherboard of the computer or into other devices, such as a gaming device.

Typically, the GPU has a "logical graphics pipeline," which may accept as input some representation of a 2D or 3D scene and output a bitmap that defines a 2D image for display. For example, the DIRECTX collection of application programming interfaces by MICROSOFT CORPORATION, including the DIRECT3D API, is an example of APIs that have graphic pipeline models. The graphics pipeline typically includes a number of stages to convert a group of vertices, textures, buffers, and state information into an image frame on the screen. The GPU or graphics pipeline operates with a graphics memory, which can include buffers, such an one or more index buffers that contain indices used to identify vertices in a vertex buffers, where the index and vertex information is used to render primitives. Thus, the computer device operates the graphics pipeline to convert information about 3D objects into a bit map that can be displayed, and this process requires considerable memory and processing power.

Many video games opt for 16 bit indices. However, the number of vertices may be relatively small and a good number of these bit patterns are not needed. Additionally, many video games rely heavily on hardware instancing for culling, memory efficiency, and to save on modelling cost. This trend is likely to continue in the future with richer virtual worlds containing more incidental details and longer draw distances. It is desired to make the shading procedures more efficient, however, there are a number of complexities that make such simplifications difficult. For example, the 16 bit index format of the indices in the index buffer make it difficult to pass data between different stages of the graphics pipeline.

Therefore, there is a need for improvement in index format.

SUMMARY

The following presents a simplified summary of one or more features in order to provide a basic understanding of one or more example implementations of this disclosure. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An example implementation relates to a method, an apparatus, and a computer readable medium for index compression in a compute device. The implementation includes reading, at a processing unit in the computer device, a plurality of groups of indices each group of indices corresponding to at least a part of one of a plurality of primitives of a mesh of an object to be rendered; identifying a smallest index in each of the plurality of groups; rotating indices in each of the plurality of groups such that the smallest index is a first value or calculating a plurality of control bits for each of the plurality of groups or calculating a plurality of control bits for each of the plurality of groups; calculating unsigned delta encoded values relative to the smallest index in each of the plurality of groups for remaining indices in each of the plurality of groups; converting the plurality of groups of indices into a plurality of compressed groups of indices, wherein each one of the plurality of compressed groups of indices includes a first value corresponding to an absolute value of the smallest index of the one of the plurality of groups followed by the unsigned delta encoded values of the remaining indices of the one of the plurality of groups; and storing the plurality of compressed groups of indices. The implementation may optionally include reading, by the processing unit, the stored first value and the additional values of the indices of each of the primitives, decompressing, by the processing unit, indices of each of the primitives to determine decompressed indices by writing the absolute value for a first index and writing a sum of each unsigned delta encoded value and the absolute value for each of the remaining indices, and storing the decompressed indices.

Further, in an additional implementation, the method includes reading, at a processing unit in the computer device, a plurality of compressed groups of indices each compressed group of indices corresponding to at least a part of one of a plurality of primitives of a mesh of an object to be rendered; identifying a first index as an absolute value in each of the plurality of groups; calculating remaining indices of each of the plurality of groups by adding the absolute value and each of unsigned delta encoded values of the remaining indices; converting the plurality of compressed groups of indices into a plurality of decompressed groups of indices, wherein each one of the plurality of decompressed groups of indices includes a first value corresponding to the absolute value of the one of the plurality of groups followed by the remaining indices of the one of the plurality of groups; and storing the plurality of decompressed groups of indices. The additional implementation may optionally include wherein each of the plurality of groups of indices corresponds to more than one of the plurality of primitives, and wherein the processing unit is further configured to calculate a plurality of control bits for each of the plurality of compressed groups of indices, wherein each plurality of control bits indicate a location of the smallest index in the one of the plurality of groups; add each of the plurality of control bits to a corresponding one of the plurality of compressed groups of indices; and store each of the plurality of control bits with the corresponding one of the plurality of compressed groups of indices.

Furthermore, an example apparatus may include a computing device for index compression, comprising a processing unit configured to read, at a processing unit in the computer device, a plurality of groups of indices each group of indices corresponding to at least a part of one of a plurality of primitives of a mesh of an object to be rendered; identify a smallest index in each of the plurality of groups; rotate indices in each of the plurality of groups such that the smallest index is a first value or calculating a plurality of control bits for each of the plurality of groups or calculate a plurality of control bits for each of the plurality of groups; calculate unsigned delta encoded values relative to the smallest index in each of the plurality of groups for remaining indices in each of the plurality of groups; convert the plurality of groups of indices into a plurality of compressed groups of indices, wherein each one of the plurality of compressed groups of indices includes a first value corresponding to an absolute value of the smallest index of the one of the plurality of groups followed by the unsigned delta encoded values of the remaining indices of the one of the plurality of groups; and store the plurality of compressed groups of indices.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

FIG. 7 is a table of example index formats used in conjunction with a simple compression scheme according to the present disclosure.

FIG. 8 is a table of example index formats used in conjunction with a complex compression scheme according to the present disclosure.

DETAILED DESCRIPTION

The described implementations provide a graphical processing unit (GPU) with flexible, dynamic, and efficient index formatting, compression and de-compression mechanisms for index buffers. In particular, the described implementations allow different index formats (e.g., simple or complex index formats) for compression and/or de-compressing index buffers at a GPU.

More specifically, the described implementations describe a simple compression scheme that includes reading indices of primitives and compressing the indices of the primitives into a compressed group of indices and storing the compressed group of indices. In particular, the compressing of indices includes indicating a smallest index of a primitive as a first value followed by additional values of remaining indices of the primitive, wherein the first value is an absolute value and the additional values are unsigned delta encoded values. In some cases, such as in an alternative complex compression scheme, the compression may further include reading sets of indices associated with more than one primitive and adding control bits to each set of indices to indicate an uncompressed location of the first value, and storing the control bits for each set of indices in the compressed group of indices.

Optionally, in some cases, the compressed indices may be decompressed at a GPU, which may include reading the stored first value and the additional values of the indices of each of the primitives, and decompressing indices of each of the primitives to determine decompressed indices. The decompressing may include writing the absolute value for a first index and writing a sum of each unsigned delta encoded value and the absolute value for each of the remaining indices, and storing the decompressed indices. In some other optional cases, such as in an alternative complex compression scheme, the decompressing of the compressed indices may further include reading the stored first value and additional values of each of the sets of indices associated with more than one primitive and decompressing the sets of indices associated with more than one primitive to define decompressed sets of indices. The decompressing in this case includes writing the absolute value at the uncompressed location based on the control bits and writing a sum of each unsigned delta encoded value and the absolute value in an order while skipping the uncompressed location of the absolute value for each of the remaining indices, and storing the decompressed sets of indices.

Thus, the described index formatting, compression and de-compression mechanisms for index buffers reduce a data size of the indices and may allow more index information from the index buffer to be exchanged with the graphics pipeline and processed over a given amount of bandwidth or within a given clock cycle of the GPU.

Figure 1:
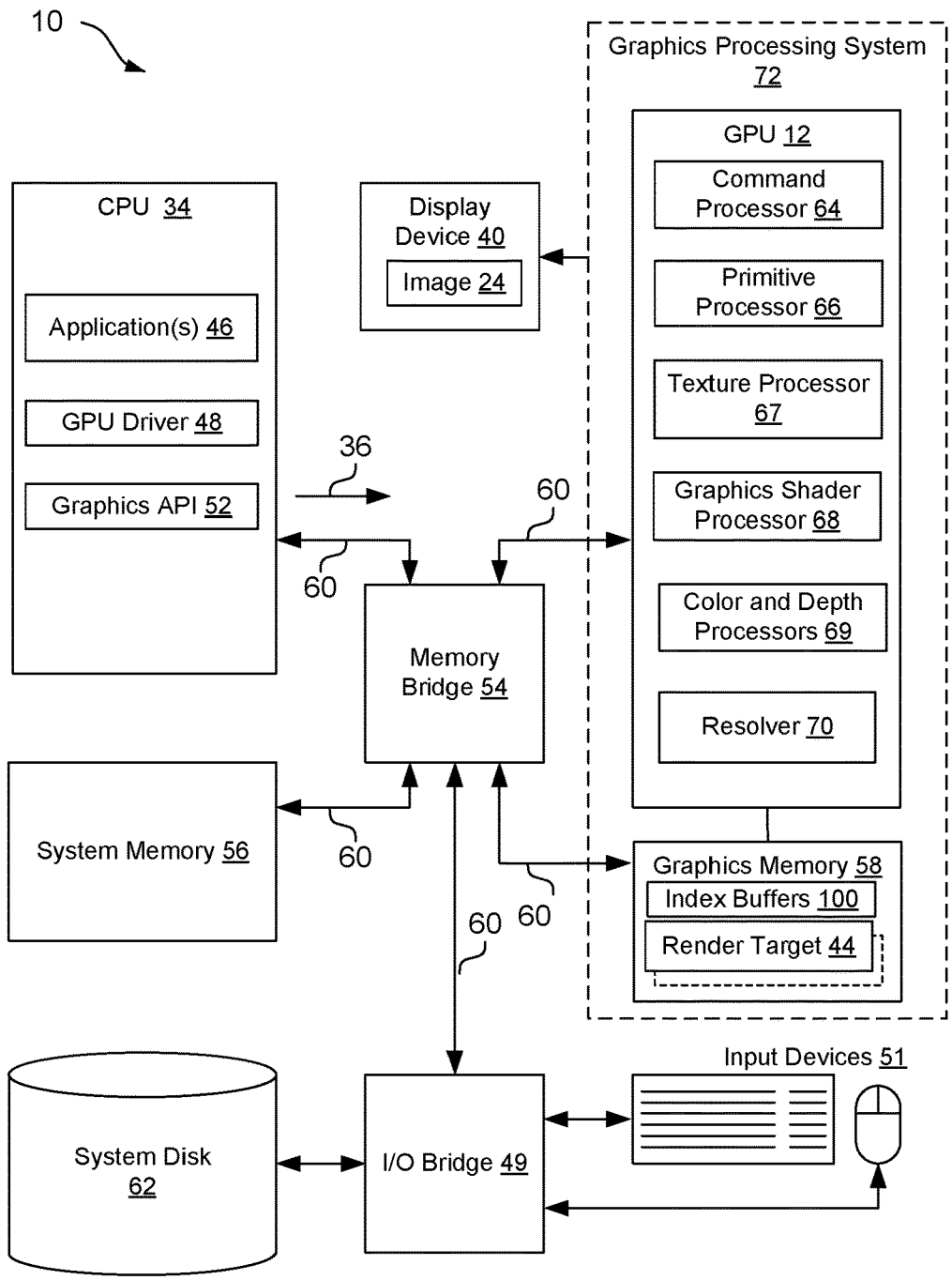
FIG. 1 is a schematic block diagram of an example architecture of a computer device including a graphics processing unit and a graphics pipeline configured according to the present disclosure.

Referring to FIG. 1, in one example, a computer device 10 includes a graphics processing unit (GPU) 12 configured to implement the described implementations of index formatting, compression and de-compression. These mechanisms may be used by GPU 12, for example, to implement forward rendering or geometry buffer laydown with improved efficiency of processing or bandwidth utilization.

For example, in one implementation, computer device 10 includes a CPU 34, which may be one or more processors that are specially-configured or programmed to control operation of computer device 10 according to the described implementations. For instance, a user may provide an input to computer device 10 to cause CPU 34 to execute one or more software applications 46. Software applications 46 that execute on CPU 34 may include, for example, but are not limited to one or more of an operating system, a word processor application, an email application, a spread sheet application, a media player application, a video game application, a graphical user interface application or another program. Additionally, CPU 34 may include a GPU driver 48 that can be executed for controlling the operation of GPU 12. The user may provide input to computer device 10 via one or more input devices 51 such as a keyboard, a mouse, a microphone, a touch pad or another input device that is coupled to computer device 10 via an input/output bridge 49, such as but not limited to a southbridge chipset or integrated circuit.

The software applications 46 that execute on CPU 34 may include one or more instructions that executable to cause CPU 34 to issue one or more graphics commands 36 to cause the rendering of graphics data associated with an image 24 on display device 40. The image 24 may comprise, for example, one or more objects, and each object may comprise one or more primitives, as explained in more detail below. For instance, in some implementations, the software application 46 places graphics commands 36 in a buffer in the system memory 56 and the command processor 64 of the GPU 12 fetches them. In some examples, the software instructions may conform to a graphics application programming interface (API) 52, such as, but not limited to, a DirectX and/or Direct3D API, an Open Graphics Library (OpenGL®) API, an Open Graphics Library Embedded Systems (OpenGL ES) API, an X3D API, a RenderMan API, a WebGL API, Vulkan API, Metal API, or any other public or proprietary standard graphics API. In order to process the graphics rendering instructions, CPU 34 may issue one or more graphics commands 36 to GPU 12 (e.g., through GPU driver 48) to cause GPU 12 to perform some or all of the rendering of the graphics data. In some examples, the graphics data to be rendered may include a list of graphics primitives, e.g., points, lines, triangles, quadrilaterals, triangle strips, etc.

Computer device 10 may also include a memory bridge 54 in communication with CPU 34 that facilitates the transfer of data going into and out of system memory 56 and/or graphics memory 58. For example, memory bridge 54 may receive memory read and write commands, and service such commands with respect to system memory 56 and/or graphics memory 58 in order to provide memory services for the components in computer device 10. Memory bridge 54 is communicatively coupled to GPU 12, CPU 34, system memory 56, graphics memory 58, and input/output bridge 49 via one or more buses 60. For example, memory bridge 54 may be a Northbridge integrated circuit or chipset.

System memory 56 may store program modules and/or instructions that are accessible for execution by CPU 34 and/or data for use by the programs executing on CPU 34. For example, system memory 56 may store the operating system application for booting computer device 10. Further, for example, system memory 56 may store a window manager application that is used by CPU 34 to present a graphical user interface (GUI) on display device 40. In addition, system memory 56 may store user applications 46 and other information for use by and/or generated by other components of computer device 10. For example, system memory 56 may act as a device memory for GPU 12 (although, as illustrated, GPU 12 may generally have a direct connection to its own graphics memory 58 which may include index buffers 100) and may store data to be operated on by GPU 12 as well as data resulting from operations performed by GPU 12. For example, system memory 56 may store any combination of texture buffers, depth buffers, stencil buffers, vertex buffers, frame buffers, or the like. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

Additionally, computer device 10 may include or may be communicatively connected with a system disk 62, such as a CD-ROM or other removable memory device. System disk 62 may include programs and/or instructions that computer device 10 can use, for example, to boot operating system in the event that booting operating system from system memory 56 fails. System disk 62 may be communicatively coupled to the other components of computer device 10 via input/output bridge 49.

GPU 12 may be configured to perform graphics operations to render one or more render targets 44 (e.g., based on graphics primitives) to display device 40 to form image 24. For instance, when one of the software applications 46 executing on CPU 34 requires graphics processing, CPU 34 may provide graphics commands and graphics data associated with image 24, along with graphics command 36, to GPU 12 for rendering to display device 40. The graphics data may include, e.g., drawing commands, state information, primitive information (e.g., vertex and index information), texture information, etc. GPU 12 may include one or more processors, including a command processor 64 for receiving graphics command 36 and initiating or controlling the subsequent graphics processing by at least one primitive processor 66 for assembling primitives, a plurality of graphics shader processors 68 for processing index, vertex, surface, pixel, and other data for GPU 12, one or more texture processors 67 for generating texture data for fragments or pixels, and one or more color and depth processors 69 for generating color data and depth data and merging the shading output. For example, primitive processor 66 may implement input assembler and rasterizer stages of a logical graphics pipeline, as is discussed below. GPU 12 may, in some instances, be built with a highly parallel structure that provide more efficient processing of complex graphic-related operations than CPU 34. For example, GPU 12 may include a plurality of processing elements that are configured to operate on multiple vertices or pixels in a parallel manner. The highly parallel nature of GPU 12 may, in some instances, allow GPU 12 to draw graphics image 24, e.g., GUIs and two-dimensional (2D) and/or three-dimensional (3D) graphics scenes, onto display device 40 more quickly than drawing the image 24 directly to display device 40 using CPU 34.

GPU 12 may, in some instances, be integrated into a motherboard of computer device 10. In other instances, GPU 12 may be present on a graphics card that is installed in a port in the motherboard of computer device 10 or may be otherwise incorporated within a peripheral device configured to interoperate with computer device 10. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In an implementation, GPU 12 may be directly coupled to graphics memory 58. For example, graphics memory 58 may store any combination of index buffers, vertex buffers, texture buffers, depth buffers, stencil buffers, render target buffers, frame buffers, state information, shader resources, constants buffers, coarse SRP maps (e.g., a 2D map of a viewable area at coarse resolution that can be used to look-up an SRP value based on a closest point in the map to the transformed vertex), unordered access view resources, graphics pipeline stream outputs, or the like. As such, GPU 12 may read data from and write data to graphics memory 58 without using bus 60. In other words, GPU 12 may process data locally using storage local to the graphics card, instead of system memory 56. This allows GPU 12 to operate in a more efficient manner by eliminating the need of GPU 12 to read and write data via bus 60, which may experience heavy bus traffic. In some instances, however, GPU 12 may not include a separate memory, but instead may utilize system memory 56 via bus 60. Graphics memory 58 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 34 and/or GPU 12 may store rendered image data, e.g., render targets 44, in a render target buffer of graphic memory 58. It should be noted that the render target buffer also may be an independent memory or may be allocated within system memory 56. GPU 12 may further include a resolver component 70 configured to retrieve the data from a render target buffer of graphic memory 58 and convert multisample data into per-pixel color values to be sent to display device 40 to display image 24 represented by the rendered image data. In some examples, GPU 12 may include a digital-to-analog converter (DAC) that is configured to convert the digital values retrieved from the resolved render target buffer into an analog signal consumable by display device 40. In other examples, GPU 12 may pass the digital values to display device 40 over a digital interface, such as a High-Definition Multi-media Interface (HDMI interface) or a DISPLAYPORT interface, for additional processing and conversion to analog. As such, in some implementations, the combination of GPU 12, graphics memory 58, and resolver component 70 may be referred to as a graphics processing system 72.

Display device 40 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display device 40 may be integrated within computer device 10. For instance, display device 40 may be a screen of a mobile telephone. Alternatively, display device 40 may be a stand-alone device coupled to computer device 10 via a wired or wireless communications link. For instance, display device 40 may be a computer monitor or flat panel display connected to a personal computer via a cable or wireless link.

According to one example of the described implementations, graphic API 52 and GPU driver 48 may configure GPU 12 to execute logical graphics pipeline 14 to perform index formatting, compression and de-compression as described herein.

Figure 2:
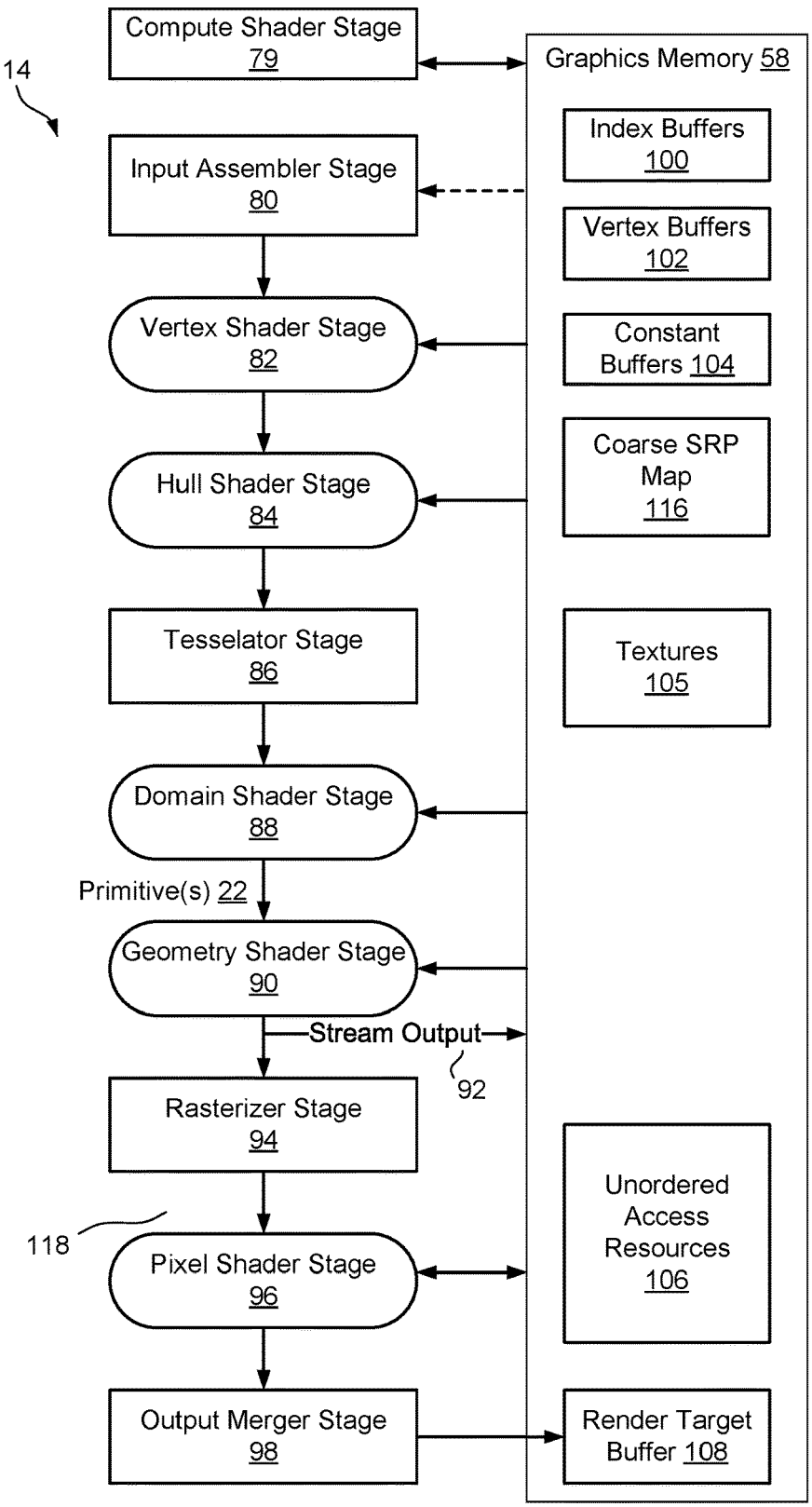
FIG. 2 is a schematic diagram of an example of the graphics pipeline and graphics memory of the computer device of FIG. 1.

Referring to FIG. 2, in one example, GPU 12 can be configured to implement the stages of an example logical graphics pipeline 14 that may to perform index formatting, compression and de-compression in conjunction with rasterization. In an implementation, one or more of the various stages may be programmable, for instance, to utilize the new, interpolated SRP values described above. Moreover, in an implementation, common shader cores may be represented by the rounded rectangular blocks. This programmability makes graphics pipeline 14 extremely flexible and adaptable. The purpose of each of the stages is now described in brief below, and additional functionality will be further described with respect to subsequent figures.

A compute shader stage 79 may obtain index and vertex information, such as from one or more index buffers 100 and one or more vertex buffers 102 and perform preprocessing of the index information to specially format and compress the indices as described herein. Additionally, in some cases, compute shader stage 79 may also perform culling to remove geometries that are not seen when image 24 is displayed. Thus, compute shader stage 79 may generate new, compressed index information for storage in one or more index buffers 100.

An input assembler stage 80 supplies data (triangles, lines, points, and indexes) to the pipeline, which may obtained from index buffers 100, vertex buffer 102, etc. The vertex shader stage 82 processes vertices, typically performing operations such as transformations, skinning, and lighting. Vertex shader stage 82 takes a single input vertex and produces a single output vertex. The hull shader stage 84, a tessellator stage 86, and a domain-shader 88 stage comprise the tessellation stages, which may be bypassed. The tessellation stages convert higher-order surfaces to triangles, e.g., primitives, for rendering within logical graphics pipeline 14.

The geometry shader stage 90 optionally (e.g., this stage can be bypassed) processes entire primitives 22. Its input may be a full primitive 22 (which is three vertices for a triangle, two vertices for a line, or a single vertex for a point), a quad, or a rectangle. In addition, each primitive can also include the vertex data for any edge-adjacent primitives. This could include at most an additional three vertices for a triangle or an additional two vertices for a line. The geometry shader stage 90 also supports limited geometry amplification and de-amplification. Given an input primitive 22, the geometry shader can discard the primitive, or emit one or more new primitives.

The stream-output stage 92 streams primitive data from graphics pipeline 14 to graphics memory 58 on its way to the rasterizer. Data can be streamed out and/or passed into a rasterizer stage 94. Data streamed out to graphics memory 58 can be recirculated back into graphics pipeline 14 as input data or read-back from the CPU 34 (FIG. 1).

The rasterizer stage 94 clips or culls primitives (e.g., removing primitives not in view from further processing), prepares primitives for a pixel shader stage 96, and determines how to invoke pixel shaders. Additionally, the rasterizer stage 94 performs fine scan conversions and determines pixel sample positions covered by the fragments. The pixel shader stage 96 receives interpolated data for primitives and/or fragments and generates per-pixel data, such as color and sample coverage masks. The output merger stage 98 combines various types of pipeline output data (pixel shader values, depth and stencil information, and coverage masks) with the contents of the render target 44 (FIG. 1) and depth/stencil buffers to generate the final result of graphics pipeline 14.

Also, graphics pipeline 14 may operate in conjunction with graphics memory 58 for exchanging and storing data. For example, graphics memory 58 may include one or more index buffers 102, which contain integer offsets into vertex buffers 100 and are used to render primitives 22 more efficiently. Each index buffer 102 contains a sequential set of indices; each index is used to identify a vertex in a vertex buffer.

Further, graphics memory 58 may include one or more vertex buffers 100 that each contains the vertex data used to define geometry of image 24 (or other images). Vertex data includes position coordinates, color data, texture coordinate data, normal data, and so on. The simplest example of vertex buffer 100 is one that only contains position data. More often, vertex buffer 100 contains all the data needed to fully specify 3D vertices. An example of this could be vertex buffer 100 that contains per-vertex position, normal and texture coordinates. This data is usually organized as sets of per-vertex elements.

Also, graphics memory 58 may include one or more constant buffers 104 that allows an efficient supply of shader constants, shader data, and/or any other shader resources to graphics pipeline 14. Further, constant buffer 104 can be used to store the results of the stream-output stage 92. Moreover, graphics memory 58 may include one or more texture buffers or textures data 105, such as bitmaps of pixel colors that give an object the appearance of texture.

Additionally, graphics memory 58 may include one or more unordered access view resources 106 (which includes buffers, textures, and texture arrays—without multisampling). Unordered access resources 106 allow temporally unordered read/write access from multiple threads. This means that this resource type can be read/written simultaneously by multiple threads without generating memory conflicts through the use of certain defined functions.

Moreover, graphics memory 58 may include one or more render target buffers 108, which contain the rendered target or drawing (e.g., render target 44 of FIG. 1) of each pixel 32 of image 24 produced by graphics pipeline 14.

Figure 5:
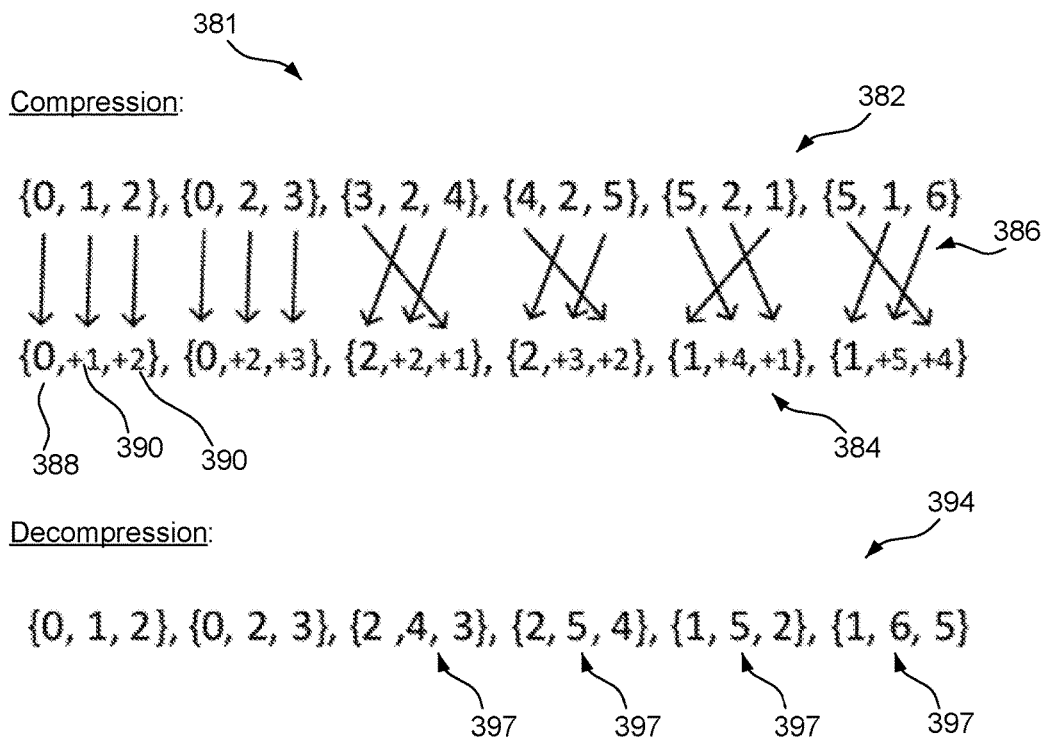
FIG. 5 is a schematic diagram of a simple compression example of index formatting, compression, and decompression applied to the indices of the mesh of FIG. 4.
Figure 6:
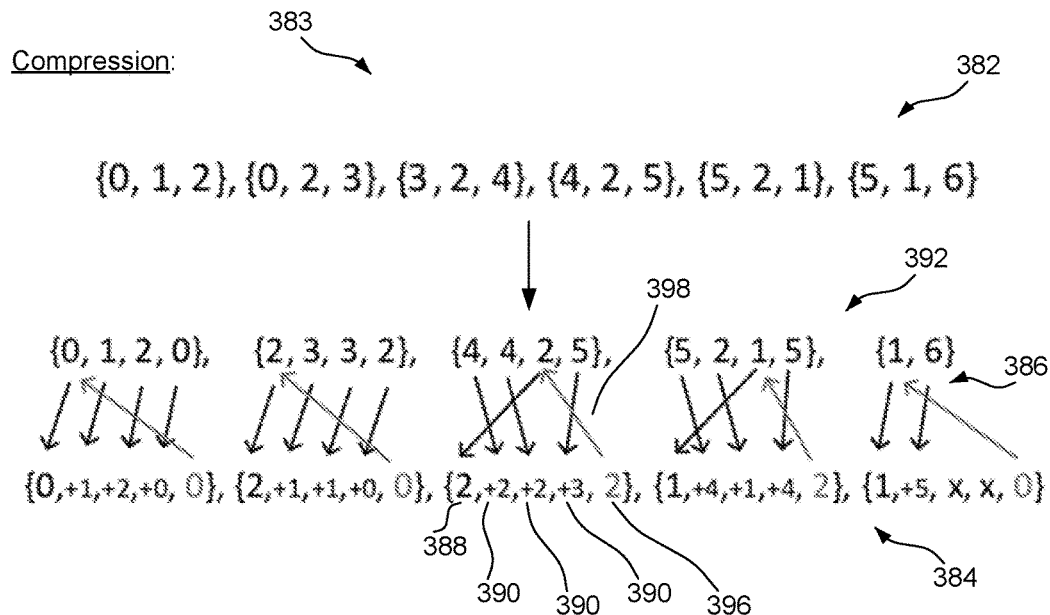
FIG. 6 is a schematic diagram of a complex compression example index formatting, compression, and decompression applied to the indices of the mesh of FIG. 4.
Figure 6:
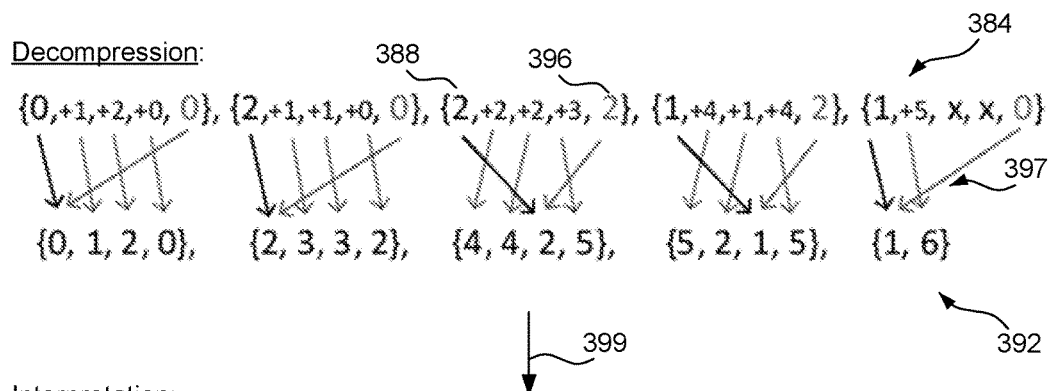

Referring to FIGS. 3-6, an example method 300 (FIG. 3A) of operation of computer device 10 having graphics pipeline 14 for performing index formatting, e.g., compression and de-compression for index buffers, and for graphics processing and rendering image 24, is explained with reference to an example mesh 380 (FIG. 4) and an example simple formatting and compression scheme 381 (FIG. 5) and/or an example complex formatting and compression scheme 383 (FIG. 6).

Figure 3A:
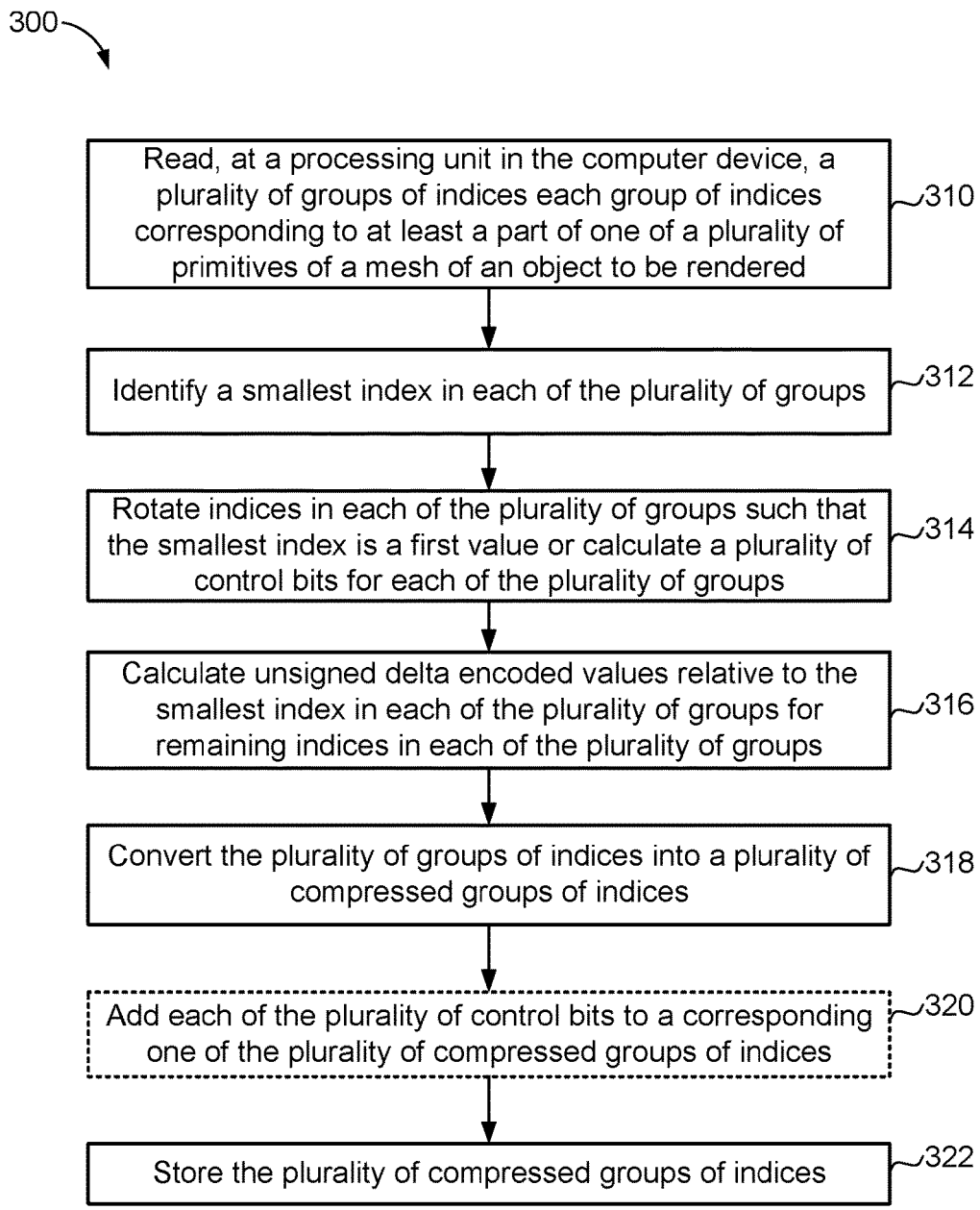
FIGS. 3A and 3B are example flowcharts of methods of index compression and decompression according to the present disclosure.

Specifically, referring to FIG. 3A, method 300 is described in the context of a mesh 380 of an object, such as a 3D model of a cube. GPU 12 may render mesh 380 of the cube as a series of triangles, triangles 1-6 (e.g., T1, T2, T3, T4, T5, and T6), with each triangle defined by three vertices, wherein the vertices may be shared between the triangles. For example, triangle 1 (T1) is defined by vertices {0, 1, 2}, triangle 2 (T2) is defined by vertices {0, 2, 3}, triangle 3 (T3) is defined by vertices {3, 2, 4}, triangle 4 (T4) is defined by vertices {4, 2, 5}, triangle 5 (T5) is defined by vertices {5, 2, 1}, and triangle 6 (T6) is defined by vertices {5, 1, 6}. The one or more index buffers 100 (FIG. 2) contain indices 382 used to identify these vertices in one or more vertex buffers 102 (FIG. 2). In other words, a vertex buffer stores vertex coordinates, an index buffer stores indices or an index array, and if the vertices stored in the vertex buffer are connected in an order defined by index array, the primitives are rendered.

At 310, method 300 includes reading, at a processing unit in the computer device, a plurality of groups of indices each group of indices corresponding to at least a part of one of a plurality of primitives of a mesh of on object to be rendered. For example, in an implementation, CPU 34, GPU 12, compute shader stage 79, and/or any other processing unit of the computer device may read a plurality of groups of indices 382, e.g., {0, 1, 2}, {0, 2, 3}, {3, 2, 4}, {4, 2, 5}, {5, 2, 1}, and/or {5, 1, 6} of triangles T1-T6. Each group of indices may correspond to at least a part of one of a plurality of primitives of a mesh of an object to be rendered. It should be understood that although a primitive may be a line, triangle, polygon, etc., a triangle is used as a reference for describing the details in this disclosure.

At 312, method 300 includes identifying a smallest index in each of the plurality of groups. For example, in an implementation, CPU 34, GPU 12, compute shader stage 79, and/or any other processing unit of the computer device may identify a smallest index in each of the groups, e.g., index "0" of {0, 1, 2}, "0" of {0, 2, 3}, "2" of {3, 2, 4}, "2" of {4, 2, 5}, "1" of {5, 2, 1}, and/or "1" of {5, 1, 6}.

At 314, method 300 includes rotating indices in each of the plurality of groups such that the smallest index is a first value or calculating a plurality of control bits for each of the plurality of groups or calculating a plurality of control bits for each of the plurality of groups. For example, in one implementation, a processing unit, e.g., CPU 34, GPU 12, compute shader stage 79, and/or any other processing unit of the computer device may rotate the indices such that the first value 388 is the smallest and also preserves the winding order, as shown in FIG. 5. That is, the first index 388 is the smallest and the first value 388 and the additional values 390 are arranged in a same winding order (e.g., direction) in each compressed index 384 relative to each primitive, e.g., in a clockwise or anti-clockwise direction. In an additional example, at 314, method 300 may calculate control bits (e.g., a plurality of control bits) for each of the plurality of groups, wherein each plurality of control bits indicate a location of the smallest index in the one of the plurality of groups. Method 300 may calculate the plurality of control bits for each of the plurality of groups when each of the plurality of groups of indices corresponds to more than one of the plurality of primitives as shown at 392 of FIG. 6. For example, in another implementation, a processing unit, e.g., CPU 34, GPU 12, compute shader stage 79, and/or any other processing unit of the computer device may calculate a plurality of control bits, e.g., control bits 396. The control bits 396 indicate an unconverted or uncompressed (e.g., initial or original) location of the first value 388. In other words, the control bits 396 indicates a location of the smallest index in the one of the plurality of groups as illustrated in FIG. 6. For example, as indicated at 398 in reference to the set of reformatted indices {4, 4, 2, 5} and the set of compressed indices {2, +2, +2, +3, 2}, the value "2" of control bits 396 indicates that the first value 388 (e.g., "2" in this case) was originally 2 positions away from its current initial position in the set.

At 316, method 300 includes calculating unsigned delta encoded values relative to the smallest index in each of the plurality of groups for remaining indices in each of the plurality of groups. For example, in an implementation, CPU 34, GPU 12, compute shader stage 79, and/or any other processing unit of the computer device may calculate unsigned delta encoded values, (e.g., a value that is added to the absolute value to obtain the original value) which may be a difference between the smallest index and index values of the remaining indices e.g., "+1" and "+2" (390) relative to the smallest index "0" (388) for index group {0, 1, 2}; "+2" and "+3" relative to the smallest index "0" for index group {0, 2, 3}; "+2" and "+1" relative to the smallest index "2" for index group {3, 2, 4}; "+3" and "+2" relative to the smallest index "2" for index group {4, 2, 5}; "+4" and "+1" relative to the smallest index "1" for index group {5, 2, 1,}; and/or "+5" and "+4" relative to the smallest index "1" for index group {5, 1, 6}.

At 318, method 300 includes converting the plurality of groups of indices into a plurality of compressed groups of indices, wherein each one of the plurality of compressed groups of indices includes a first value corresponding to an absolute value of the smallest index of the one of the plurality of groups followed by the unsigned delta encoded values of the remaining indices of the one of the plurality of groups. For example, in an implementation, CPU 34, GPU 12, compute shader stage 79, and/or any other processing unit of the computer device may convert the plurality of groups of indices 382 into a plurality of compressed groups of indices 384.

For instance, referring to FIG. 5 (e.g., a case of a simple formatting/compression scheme), indices 382 of each triangle T1 to T6 are converted to output compressed indices 384. Specifically, index 382 of triangle T1, e.g., indices {0, 1, 2}, are converted and/or rotated (or rearranged), also referred to as compressed, as indicated at 386, into compressed index 384, e.g., {0, +1, +2}, wherein the first value 388 (which may be an absolute value) of "0" in the compressed index 384 indicates or represents the smallest index of triangle T1 followed by the additional values 390 of "+1" and "+2," which are unsigned delta encoded values, e.g., unsigned deltas (relative to the smallest value). It should be noted that indices {0, 1, 2} of triangle T1 are not rotated prior to conversion/compression as it is not needed. In an additional example, indices of triangle T5, {5, 2, 1}, are compressed into {1, +4, +1}, wherein the first value of "1" indicates the smallest index of triangle 5 followed by the additional values "+4" and "+1" which are unsigned delta encoded values for the remaining indices. It should be noted that indices {5, 2, 1} of triangle T5 are rotated prior to delta encoding. The indices of each of the other triangles, e.g., triangles, T2, T3, T4, and T6 may be converted/compressed (e.g., rotated and/or delta encoded) in a similar manner. It should also be noted that the first value 388 and the additional values 390 are arranged in a same winding order (e.g., direction) in each compressed index 384 relative to each primitive, e.g., in a clockwise or anti-clockwise direction.

Additionally, at 320, method 300 may optionally add each of the plurality of control bits to a corresponding one of the plurality of compressed groups of indices. For example, in an implementation, a processing unit, e.g., CPU 34, GPU 12, compute shader stage 79, and/or any other processing unit of the computer device may, as indicated by 384 of FIG. 6, add control bits 396 to each set of indices (or each block of indices) to define converted/compressed indices 384. For example, as indicated at 398 in reference to the set of reformatted indices {4, 4, 2, 5} and the set of compressed indices {2, +2, +2, +3, 2}, a value "2" of control bits 396 indicates that the first value 388 (e.g., 2 in this case) was originally 2 positions away from its current initial position in the set. As such, the control bits 396 enable converted (or compressed) indices 384 to be converted, converted back, de-converted, or decompressed and rearranged to return each of the indices to their original position in the set. The processing unit may then store the compressed indices 384 in index buffer 100 at 322 of method 300.

At 322, method 300 includes storing the plurality of compressed group of indices. For example, in an implementation, a processing unit, e.g., CPU 34, compute shader stage 79, and/or any other processing unit of the computer device may store the compressed group of indices 384, e.g., indices {0, +1, +2}, {0, +2, +3}, {2, +2, +1}, {2, +3, +2}, {1, +4, +1}, and/or {1, +5, +4}, in index buffer 100 (FIG. 2). In an additional implementation, a processing unit, e.g., CPU 34, compute shader stage 79, and/or any other processing unit of the computer device may store the compressed group of indices 384, e.g., indices {0, +1, +2, +0, 0}, {2, +1, +1, +0, 0}, {2, +2, +2, +3, 2}, {1, +4, +1, +4, 2}, and/or {1, +5, x, x, 0} in index buffer 100 (FIG. 2).

Figure 3B:
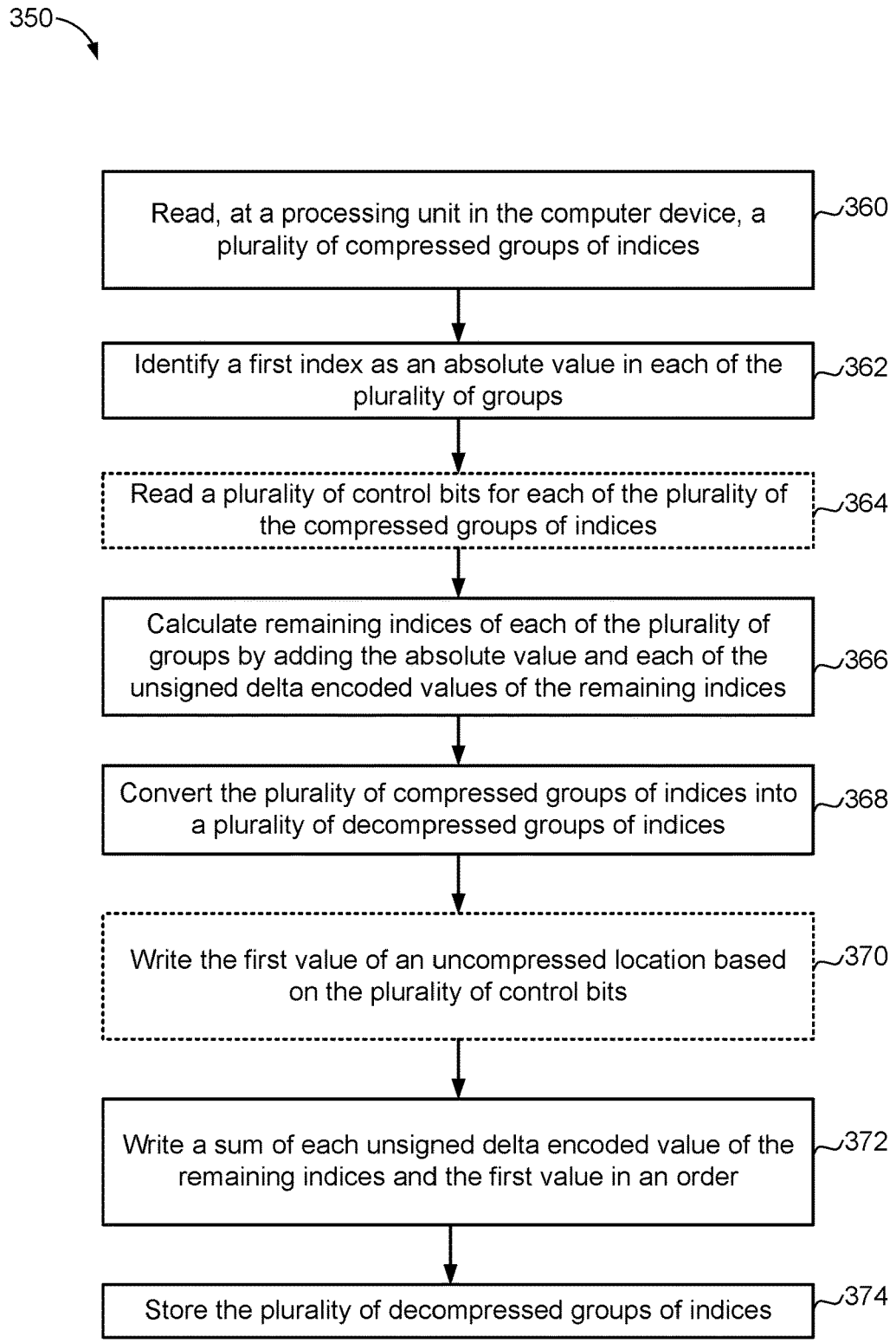
Figure 4:
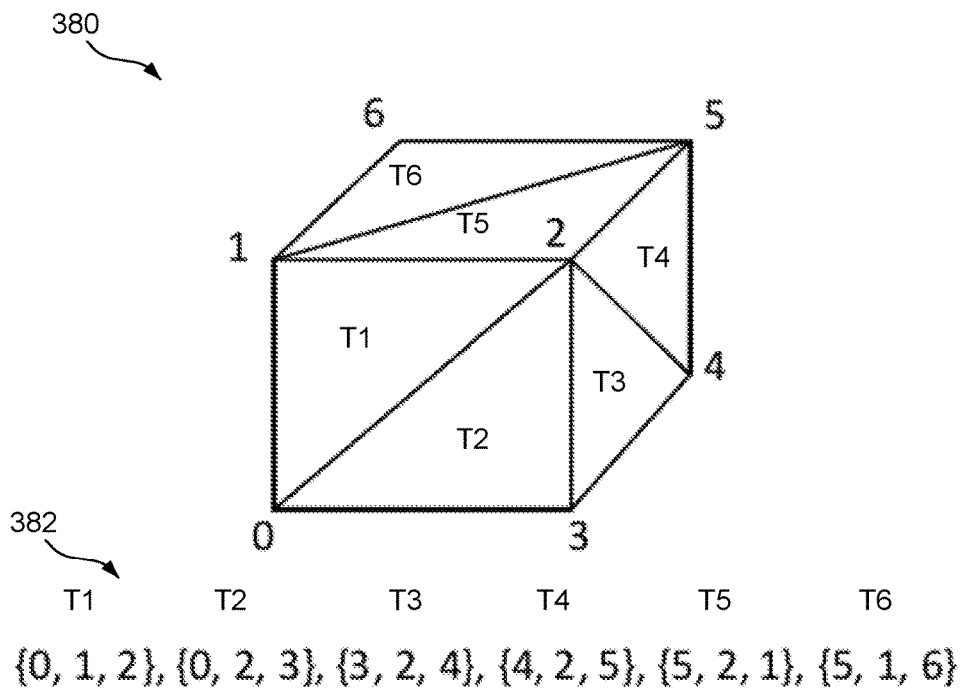
FIG. 4 is a schematic diagram of a mesh of an example object to which the index formatting and compression described herein may be applied.

Referring to FIG. 3B, an example method 350 for decompressing indices is described.

At 360, method 350 includes reading, at a processing unit in the computer device, a plurality of compressed groups of indices. For example, in an implementation, CPU 34, GPU 12, compute shader stage 79, and/or any other processing unit of the computer device may read a plurality of groups of indices 384. In one example, the plurality of compressed groups of indices 384 may include {0, +1, +2}, {0, +2, +3}, {2, +2, +1}, {2, +3, +2}, {1, +4, +1}, and/or {1, +5, +4} as shown in FIG. 5. In an additional example, the plurality of compressed groups of indices 384 may include {0, +1, +2, +0, 0}, {2, +1, +1, +0, 0}, {2, +2, +2, +3, 2}, {1, +4, +1, +4, 2}, and/or {1, +5, x, x, 0}.

At 362, method 350 includes identifying (or interpreting) the first index as an absolute value in each of the plurality of groups. For example, in an implementation, CPU 34, GPU 12, compute shader stage 79, and/or any other processing unit of the computer device may identify (or interpret) that a first index 388, e.g., a value of "0" (for simple formatting or compression in FIG. 5) or a value of "2" (for complex formatting or compression in FIG. 6) as an absolute value.

In an additional implementation, at 364, method 350 may optionally include reading a plurality of control bits for each of the plurality of compressed groups of indices. Method 300 may read the plurality of control bits for each of the plurality of groups when each of the plurality of groups of indices corresponds to more than one of the plurality of primitives. For example, in an implementation, a processing unit, e.g., CPU 34, GPU 12, compute shader stage 79, and/or any other processing unit of the computer device may read control bits 396 for each of the plurality of compressed group of indices. The control bits 396 indicate an unconverted or uncompressed (e.g., initial or original) location of the first value 388.

At 366, method 350 includes calculating remaining indices of each of the plurality of groups by adding the absolute value and each of unsigned delta encoded values of the remaining indices. For example, in an implementation, CPU 34, GPU 12, compute shader stage 79, and/or any other processing unit of the computer device may calculate remaining indices by adding the absolute value 388, e.g., a value of "0" (for simple formatting or compression in FIG. 5) or a value of "2" (for complex formatting or compression in FIG. 6) and each of the unsigned delta encoded values 390 of the remaining indices. That is, the remaining indices are calculated for each of the plurality of groups of indices by adding absolute value 388 to each of the unsigned delta encoded values 390 of the remaining indices. For example, the remaining indices 390 may be calculated as "1" and "2" as shown in FIG. 5 or 1, 2, 0 as shown in FIG. 6 (described in further detail in reference to FIG. 6).

At 368, method 350 includes converting the plurality of compressed groups of indices into a plurality of decompressed groups of indices, wherein each one of the plurality of decompressed groups of indices includes a first value corresponding to the absolute value of the one of the plurality of groups followed by the remaining indices of the one of the plurality of groups. For example, in an implementation, CPU 34, GPU 12, compute shader stage 79, and/or any other processing unit of the computer device may convert the plurality of compressed groups of indices 384 into a plurality of decompressed groups of indices 394 or 392, wherein each one of the plurality of decompressed groups of indices includes a first value corresponding to the absolute value of the one of the plurality of groups followed by the remaining indices of the one of the plurality of groups. For example, the conversion may include converting {0, +1, +2} to {0, 1, 2} as shown in FIG. 5 and/or {0, +1, +2, +0, 0} to {0, 1, 2, 0} as shown in FIG. 6.

For instance, referring to FIG. 5, for the first primitive, e.g., triangle T1, any processing unit may convert (or decompress) the compressed indices 384 by writing the absolute value "0" for the first index and sum of each delta, "+1" and "+2" with the absolute value "0" for the remaining indices. That, is CPU 34, GPU 12, compute shader stage 79, and/or any processing unit may decompresses the compressed indices 384 to generated decompressed indices 394. For example, the processing unit decompresses the compressed indices 384 for T1, e.g., {0, +1, +2}, to generate decompressed index 394 of T1, e.g., {0, 1, 2}. A similar procedure is used for decompressing the compressed indices 384 of the other primitives, e.g., triangles T2-T6. However, it should be noted that when the indices for triangles T4-T6 are decompressed, the indices are rotated 396, e.g., not exactly in the same order as in the original set of indices 382. However, this does not make a difference if the compression or decompression mechanism described above, also referred to as a simple compression or simple compression scheme, is used for triangle primitives for effective use of delta bits. In one implementation, for example, CPU 34 may be used for decompressing the indices. This may be relevant when the indices are compressed offline and input assembler stage 80 could not interpret an application running on GPU 12. In such a scenario, a title may decompress the indices before use, either using CPU 34 or a shader stage on a GPU, e.g., a compute shader.

In an additional implementation, at 370, method 350 may optionally include writing the first value of an uncompressed location based on the plurality of control bits. For example, in an implementation, a processing unit, e.g., CPU 34, GPU 12, compute shader stage 79, and/or any other processing unit of the computer device may write the first value 388 of the uncompressed location based on the control bits 396 as illustrated at 392 of FIG. 6.

At 372, method 350 may include writing a sum of each unsigned delta encoded value of the remaining indices and the first value in an order while skipping the uncompressed location of the first value for each of the remaining indices. For example, in an implementation, a processing unit, e.g., CPU 34, GPU 12, compute shader stage 79, and/or any other processing unit of the computer device may write a sum of each unsigned delta encoded value of the remaining indices 390 and the first value 388 in an order as illustrated at 392 of FIG. 6.

At 374, method 350 includes storing the plurality of decompressed groups of indices. For example, in an implementation, a processing unit, e.g., CPU 34, GPU 12, compute shader stage 79, and/or any other processing unit of the computer device may store the decompressed group of indices 397 or 392 in index buffer 100 (FIG. 2).

Further, as generally indicated at 399, the processing unit may be configured to interpret decompressed set of indices 392 as the set of original indices 382, e.g., as the indices for triangles T1 to T6 in the original order. The above described complex compression scheme and can be used with any topology as there is no change in order, for example, due the use of control bits 396.

The compression schemes (simple and complex) described above are used for compressing indices for better performance when reading/writing index data, storing index data on a disk, loading index data, and memory may be saved as well (e.g., less memory is used).

Referring to FIG. 6, in another implementation where the complex formatting, compression and/or decompression mechanism may be used, a processing unit, e.g., CPU 34, GPU 12, compute shader stage 79, input assembler stage 80, and/or any other stage of graphics pipeline 14 may read sets (e.g., blocks) of indices 382 associated with one or more primitives (e.g., more than one primitive; or one primitive with more than three indices, e.g., a quad). In the example mesh 380 of FIG. 4, for instance, the processing unit may generally read four indices in each read and encode (e.g., reformat) the original indices 382 into a reformatted set of indices 392. For example, for mesh 380 of the cube of FIG. 4, the 18 indices of the six triangles T1-T6 are encoded into 4.5 blocks representing reformatted set of indices 392. Specifically, the processing unit may encode indices 382, e.g., {0, 1, 2}, {0, 2, 3}, {3, 2, 4}, {4, 2, 5}, {5, 2, 1}, and {5, 1, 6} into new reformatted set of indices 392, e.g., {0, 1, 2, 0}, {2, 3, 3, 2}, {4, 4, 2, 5}, {5, 2, 1, 5}, and {1, 6}. CPU 34, GPU 12, compute shader stage 79, input assembler stage 80, and/or any other stage of graphics pipeline 14 may then compress and rotate (or rearrange), as indicated at 386, the reformatted set of indices 392 using the compression scheme described above.

Additionally, as indicated at 384, the processing unit may further add control bits 396 to each set of indices (or each block of indices) to define compressed indices 384. The control bits 396 indicate an uncompressed (e.g., initial or original) location of the first value 388. For example, as indicated at 398 in reference to the set of reformatted indices {4, 4, 2, 5} and the set of compressed indices {2, +2, +2, +3, 2}, the value "2" of control bit 396 indicates that the first value 388 (e.g., "2" in this case) was originally 2 positions away from its current initial position in the set. As such, the control bits 396 enable compressed indices 384 to be decompressed and rearranged to return each of the indices to their original position in the set. The processing unit may then store the compressed indices 384 in index buffer 100.

During decompression, a processing unit, e.g., CPU 34, GPU 12, compute shader stage 79, and/or any other processing unit of the computer device 14 may read the stored first value 388 and the additional values 390 of each of the groups of compressed indices 384. Then, as generally indicated at 397, the processing unit, e.g., CPU 34, GPU 12, compute shader stage 79, etc. may define reformatted set of indices 392 by writing the first value 388 of the uncompressed location in the set based on the control bits 396 and writing a sum of each unsigned delta encoded additional value 390 and the first value 380 in an order, while skipping the uncompressed location of the first value 388, for each of the remaining slots. That is, the control bits 396 indicate where the first value 388 is written, and each unsigned delta compressed additional value 390 is then decompressed (reverse unsigned delta compressed) and written in an order, skipping over the reformatted location of the first value 388.

The processing unit may then store the decompressed reformatted set of indices 392 in compute shader 79 or input assembler 80. Further, as generally indicated at 399, the processing unit may be configured to interpret reformatted set of indices 392 as the set of original indices 382, e.g., as the indices for triangles T1 to T6 in the original order. The above described complex compression scheme and can be used with any topology as there is no change in order, for example, due to the use of control bits 396.

The compression schemes (simple and complex) described above are used for compressing indices for better performance when reading/writing index data, storing on a disk, load times, and/or and memory may be saved as well (e.g., less memory is used).

FIG. 7 is a table 400 of examples of index formats 410 and corresponding absolute values 420, deltas 430, comments 440, bytes 450, and bandwidth 460. These example index formats 410 may be used in conjunction with the simple compression scheme described above. For example, index format 412, e.g., "12_1010," represents a 32 bit (4 bytes) format that includes 12 bits for the absolute value, for a maximum of 4095 absolute values, and 10 bits for each of two unsigned deltas (a maximum of 1024 unsigned delta values for each unsigned delta). In another example, index format 414, e.g., "14_99," represents a 32 bit format that includes 14 bits for the absolute value, for a maximum of 16383 absolute values, and 9 bits for each of two unsigned deltas (a maximum of 512 unsigned delta values for each unsigned delta). In a simple compression scheme, a value of "1" is subtracted from each delta value on compression and a value of '1" is added on decompression to obtain a maximum range of 1024 or 512 (instead of maximum ranges of 1023/511). The index formats 412 and 414 may be referred to as simple formats, and/or may achieve compression which may occupy about, for example, 66% of bandwidth compared to the most commonly used 16 bit index formats.

Additionally, in one implementation, 10 bits for unsigned delta values gives a range of 1-1024. For example, when indices {0, 1, 2}, {0, 2, 3}, {3, 2, 4}, {4, 2, 5}, {5, 2, 1}, {5, 1, 6} are compressed to {0, +1, +2}, {0, +2, +3}, {2, +2, +1}, {2, +3, +2}, {1, +4, +1}, {1, +5, +4}, the two unsigned delta values of each triangle have an implicit "+1" that is removed on compression and added on decompression. This may result in storing {0, 0, 1}, {0, 1, 2}, {2, 1, 0}, {2, 2, 1}, {1, 3, 0}, {1, 4, 3} to provide more range (for unsigned delta values). This applies to only simple compression schemes.

FIG. 8 is a table 500 of examples of index formats 410 and corresponding absolute values 420, deltas 430, comments 440, bytes 450, and bandwidth 460. These example index formats 410, namely index formats 512, 514, and 516, may be used in conjunction with the complex compression scheme described above. For example, index format 512, e.g., "9_777_2" represents a 32 bit (4 bytes) format that includes 9 bits for the absolute value (giving a maximum of 511), 7 bits for each of three unsigned deltas (giving a maximum of 127 for each unsigned delta value), and 2 bits for control bits, e.g., for rearranging the order of the indices. In an another example, index format 514, e.g., "16_101010_2," represents a 48 bit (6 bytes) format that includes a 16 bit absolute value, 10 bits for each of three unsigned deltas (giving a maximum of 1023 for each unsigned delta value), and 2 bits for control bits. In another example, index format 516, e.g., "32_101010_2," represents a 64 bit format (8 bytes) that includes a 32 bit absolute value, 10 bits for each of three unsigned deltas, and 2 bits for control bits. It should be noted that index format 514 may achieve a compression rate of 75% and index formats 512 and 516 may achieve a compression rate of 50% as compared to 32 bit index formats. The index formats 512 and 516 may achieve compression rates which may be occupy about, for example, 50% of bandwidth compared to current index format schemes. However, index format 514 may provide for better range, but may not achieve optimal compression as index format occupies 514 about 75% of bandwidth of current index format schemes.

Figure 9:
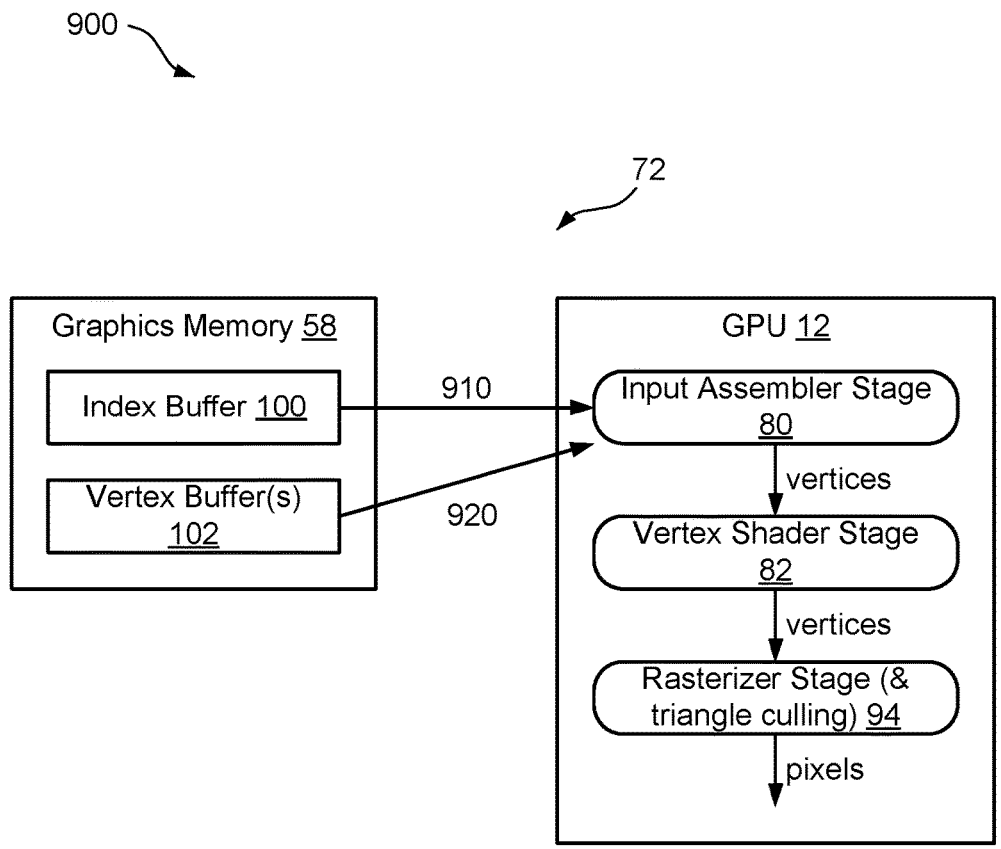
FIG. 9 is schematic diagram of an example use case for one or more implementations of the present disclosure.

FIG. 9 is an example use case 900 illustrated with a portion of graphics processing system 72 where input assembler stage 80 is aware of the compression scheme used to store data in index buffer 100. The compression scheme may be a simple compression scheme or a complex compress scheme as described above, or some other compression scheme. At 910, input assembler 80 reads the compressed indices (e.g., compressed indices 384 from FIG. 5 or FIG. 6) from index buffer 100 and decompresses the indices at input assembler stage 80. The amount of bandwidth used at 910 by input assembler stage 80 for reading the indices is less as compared to current solutions, as the indices are in compressed form (e.g., compressed indices 384 from FIG. 5 or FIG. 6) in index buffer 100. In other words, the compression of the indices in index buffer 100 reduces the amount of graphics memory 58 that GPU 12 (e.g., input assembler stage 80) has to read. This may reduce the amount of bandwidth used by GPU 12 and/or allows for higher data transfer rate. Then, input assembler stage 80 de-compresses the compressed indices, as described above in reference to FIGS. 3-6, and GPU 12 continues with the rendering process at vertex shader stage 82 and rasterizer stage 94 for rendering pixels by as described above in reference to FIGS. 1 and 2.

Figure 10:
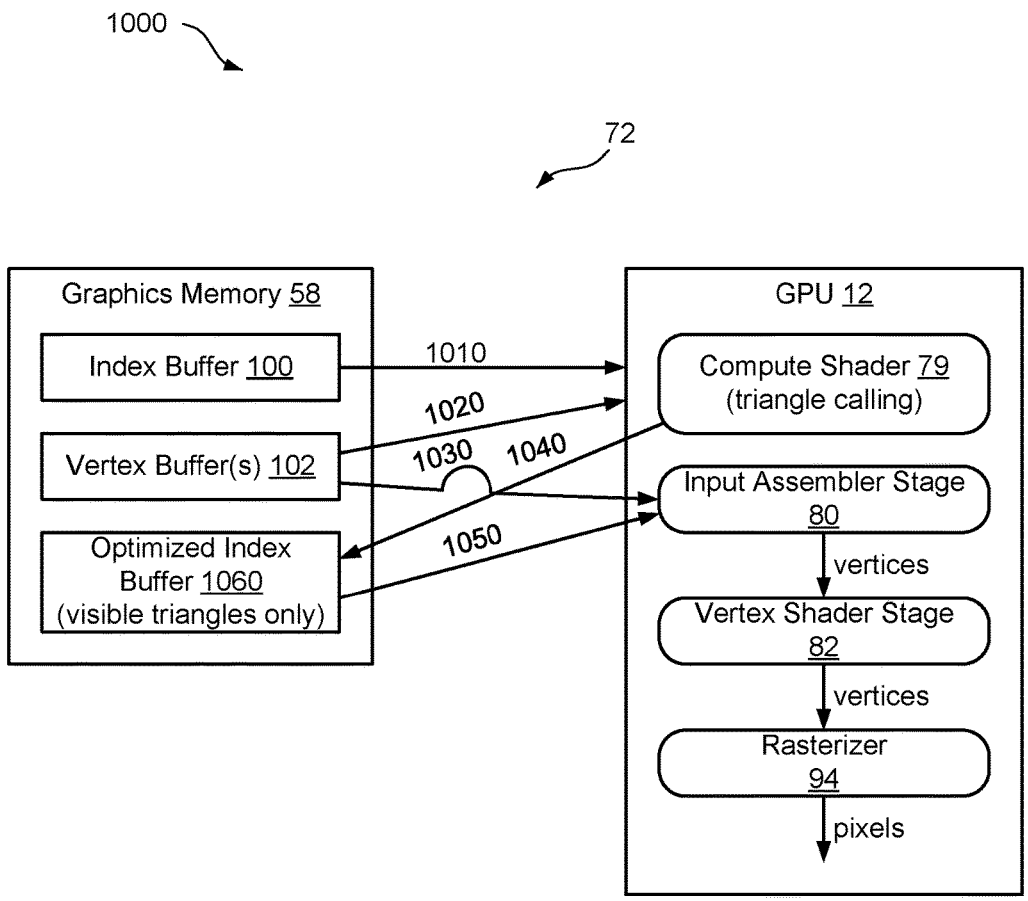
FIG. 10 is schematic diagram of another example use case for one or more implementations of the present disclosure.

FIG. 10 is an another example use case 1000 illustrated with a portion of graphics processing system 72 such that, when a mesh is rendered, compute shader 79 may be run to load the mesh (indices, vertices). Compute shader 79 performs operations such as transformations, triangle culling, etc., and writes the output of compute shader 79 into another index buffer, optimized index buffer 1060 which contains visible triangles only. That is, triangles such as backfacing triangles, etc. are culled during culling operation at compute shader 79 (e.g., culling operations performed by the hardware, compute shader 79). Input assembler 80 reads index data from optimized index buffer 1060 using a procedure similar to FIG. 9 as described above for rendering pixels. It should be noted that the benefits of compression is larger in use case 1000 as a) compute shader 79 reads compressed indices from index buffer 100, b) compute shader 79 writes only visible triangles into optimized index buffer 1040, and c) input assembler 80 reads compressed indices from optimized index buffer 1060. In one implementation, simple compression scheme described above in reference to FIGS. 4-5 may be used in use case 1000 as it is relatively easy to discard non-visible triangles when storing visible triangles only in optimized index buffer 1060. Input assembler 80 reads the compressed indices from optimized index buffer 1060 and de-compresses compressed indices at input assembler 80, as described above in reference to FIG. 4, and GPU 12 continues with the rendering process at vertex shader stage 82 and rasterizer stage 94 for rendering pixels by as described above in reference to FIGS. 1 and 2.

Therefore, as described above in reference to FIGS. 3-7, indices stored in index buffers 100 may be formatted and compressed efficiently for improved operations at GPU 12.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., computer device 10), which can be a wired device or a wireless device. Such devices may include, but are not limited to, a gaming device or console, a laptop computer, a tablet computer, a personal digital assistant, a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a computer device (such as, but not limited to, a game console). In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with implementations disclosed herein.

What is claimed is:

1. A method of index compression in a computer device, comprising:
reading, at a processing unit in the computer device, a plurality of groups of indices, each group of the plurality of groups of indices corresponding to at least a part of one of a plurality of primitives of a mesh of an object to be rendered;
identifying a smallest index in each of the plurality of groups of indices;
calculating a plurality of control bits for each of the plurality of groups of indices, wherein each of the plurality of control bits indicate a location of the smallest index in each of the plurality of groups of indices;
calculating unsigned delta encoded values relative to the smallest index in each of the plurality of groups of indices for remaining indices in each of the plurality of groups of indices;
converting the plurality of groups of indices and the plurality of control bits into a plurality of compressed groups of indices, wherein each one of the plurality of compressed groups of indices includes a first value corresponding to an absolute value of the smallest index of the one of the plurality of groups of indices followed by the unsigned delta encoded values of the remaining indices of the one of the plurality of groups of indices and a corresponding control bit of the plurality of control bits; and storing the plurality of compressed groups of indices.

2. The method of claim 1, wherein the first value and the unsigned delta encoded values of the remaining indices are arranged in a same winding order relative to each primitive.

3. The method of claim 1, wherein storing the plurality of compressed groups of indices includes storing the absolute value and the unsigned delta encoded values in a number of bits having a power of two using a single memory instruction.

4. The method of claim 1, wherein storing the plurality of compressed groups of indices further comprises storing using a total of thirty two bits, including:
  using twelve bits for the absolute value and ten bits for each of the unsigned delta encoded values; or
  using fourteen bits for the absolute value and nine bits for each of the unsigned delta encoded values.

5. The method of claim 1, wherein each of the plurality of groups of indices corresponds to a single plurality of primitives.

6. The method of claim 1, wherein each of the plurality of groups of indices corresponds to more than one of the plurality of primitives;
  wherein the converting further comprises adding each of the plurality of control bits to a corresponding one of the plurality of compressed groups of indices; and
  wherein the storing further comprises storing each of the plurality of control bits with the corresponding one of the plurality of compressed groups of indices.

7. The method of claim 6, wherein storing the plurality of compressed groups of indices includes storing in a size suitable for one or two memory instructions.

8. The method of claim 7, wherein storing the plurality of compressed groups of indices further comprises:
  storing using a total of thirty two bits with nine bits for the absolute value, seven bits for each of three unsigned delta encoded values, and two bits for each of the plurality of control bits; or
  storing using a total of forty eight bits with sixteen bits for the absolute value, ten bits for each of three unsigned delta encoded values, and two bits for each of the plurality of control bits; or
  storing using a total of sixty four bits with thirty two bits for the absolute value, ten bits for each of three unsigned delta encoded values, and two bits for each of the plurality of control bits.

9. The method of claim 1, further comprising rotating indices in each of the plurality of groups of indices such that the smallest index is the first value.

10. A method of index decompression in a computer device, comprising:
  reading, at a processing unit in the computer device, a plurality of compressed groups of indices, each compressed group of the plurality of compressed groups of indices corresponding to at least a part of one of a plurality of primitives of a mesh of an object to be rendered;
  identifying a first index as an absolute value in each of the plurality of compressed groups of indices;
  calculating remaining indices of each of the plurality of compressed groups of indices by adding the absolute value and each of unsigned delta encoded values of the remaining indices;
  reading a plurality of control bits for each of the plurality of compressed groups of indices, wherein each control bit of the plurality of control bits indicate a location of a smallest index in each of the plurality of compressed groups of indices;
  converting the plurality of compressed groups of indices into a plurality of decompressed groups of indices based on the plurality of control bits, wherein each one of the plurality of decompressed groups of indices includes a value corresponding to the absolute value of the smallest index arranged at the location indicated by each control bit and includes the remaining indices of the one of the plurality of decompressed groups of indices; and
  storing the plurality of decompressed groups of indices.

11. The method of claim 10, wherein the value and the unsigned delta encoded values of the remaining indices are read in a same winding order relative to each primitive.

12. The method of claim 10, wherein each of the plurality of decompressed groups of indices corresponds to a single plurality of primitives.

13. The method of claim 10, wherein each of the plurality of decompressed groups of indices corresponds to more than one of the plurality of primitives
  wherein the converting further comprises writing the value of an uncompressed location based on the plurality of control bits and writing a sum of each unsigned delta encoded value of the remaining indices and the value in an order while skipping the uncompressed location of the value for each of the remaining indices; and
  wherein the storing further comprises storing each of the plurality of decompressed groups of indices.

14. A computing device for index compression, comprising:
  a processing unit configured to:
    read, at the processing unit in the computing device, a plurality of groups of indices,
  each group of the plurality of groups of indices corresponding to at least a part of one of a plurality of primitives of a mesh of an object to be rendered;
    identify a smallest index in each of the plurality of groups of indices;
    calculate a plurality of control bits for each of the plurality of groups of indices, wherein each of the plurality of control bits indicate a location of the smallest index in each of the plurality of groups of indices;
    calculate unsigned delta encoded values relative to the smallest index in each of the plurality of groups of indices for remaining indices in each of the plurality of groups of indices;
    convert the plurality of groups of indices and the plurality of control bits into a plurality of compressed groups of indices, wherein each one of the plurality of compressed groups of indices includes a first value corresponding to an absolute value of the smallest index of the one of the plurality of groups of indices followed by the unsigned delta encoded values of the remaining indices of the one of the plurality of groups of indices and a corresponding control bit of the plurality of control bits; and
    store the plurality of compressed groups of indices.

15. The computing device of claim 14, wherein the processing unit is further configured to arrange the first value and the unsigned delta encoded values of the remaining indices in a same winding order relative to each primitive.

16. The computing device of claim 14, wherein the processing unit is further configured to store the absolute value and the unsigned delta encoded values in a number of bits having a power of two using a single memory instruction.

17. The computing device of claim 14, wherein the processing unit is further configured to store the plurality of compressed groups of indices using a total of thirty two bits, including:
   using twelve bits for the absolute value and ten bits for each of the unsigned delta encoded values; or
   using fourteen bits for the absolute value and nine bits for each of the unsigned delta encoded values.

18. The computing device of claim 14, wherein each of the plurality of groups of indices corresponds to a single plurality of primitives.

19. The computing device of claim 14, wherein each of the plurality of groups of indices corresponds to more than one of the plurality of primitives;
   add each of the plurality of control bits to a corresponding one of the plurality of compressed groups of indices; and
   store each of the plurality of control bits with the corresponding one of the plurality of compressed groups of indices.

20. The computing device of claim 19, wherein the processing unit is further configured to store the plurality of compressed groups of indices in a size suitable for one or two memory instructions.

21. The computing device of claim 20, wherein the processing unit is further configured to:
   store the plurality of compressed groups of indices using a total of thirty two bits with nine bits for the absolute value, seven bits for each of three unsigned delta encoded values, and two bits for each of the plurality of control bits; or
   store the plurality of compressed groups of indices using a total of forty eight bits with sixteen bits for the absolute value, ten bits for each of three unsigned delta encoded values, and two bits for each of the plurality of control bits; or
   store the plurality of compressed groups of indices using a total of sixty four bits with thirty two bits for the absolute value, ten bits for each of three unsigned delta encoded values, and two bits for each of the plurality of control bits.

22. The computing device of claim 14, wherein the processing unit is further configured to rotate indices in each of the plurality of groups of indices such that the smallest index is the first value.

\* \* \* \* \*